(12) United States Patent
Skirha, III et al.

(10) Patent No.: US 6,558,034 B2
(45) Date of Patent: May 6, 2003

(54) AUTOMOTIVE LAMP HOUSING WITH BOND JOINT

(75) Inventors: Dirk-Martin Skirha, III, Seymour, IN (US); Christopher J. Kirchenbauer, Seymour, IN (US)

(73) Assignee: Valeo Sylvania LLC, Seymour, IN (US)

( * ) Notice: Subject to any disclaimer, the term of this patent is extended or adjusted under 35 U.S.C. 154(b) by 0 days.

(21) Appl. No.: 09/944,519

(22) Filed: Aug. 31, 2001

(65) Prior Publication Data

US 2003/0043592 A1 Mar. 6, 2003

(51) Int. Cl.[7] ................................................ F21V 15/01
(52) U.S. Cl. ........................ 362/546; 362/457; 362/544
(58) Field of Search ................................ 362/497, 505, 362/507, 543, 544, 546, 455, 457, 458, 267, 362

(56) References Cited

U.S. PATENT DOCUMENTS

| | | | | |
|---|---|---|---|---|
| 4,675,792 A | * | 6/1987 | Dorleans | 362/546 |
| 6,120,168 A | * | 9/2000 | Brummel et al. | 362/507 |
| 6,273,594 B1 | * | 8/2001 | Ikeda et al. | 362/544 |

* cited by examiner

Primary Examiner—Y. My Quach-Lee
(74) Attorney, Agent, or Firm—William E. Meyer

(57) ABSTRACT

Vehicle lamp housing assembly that uses a multiple-piece adhesive track to secure the components together. The assembly and seal can be formed in a single operation. The invention eliminates conventional fastening means such as welding, snaps, screws and nuts, as well as extra operations that would otherwise increase the cost of the finished product. In a preferred embodiment, the same adhesive that is used to seal the lens to the housing is also used for assembly of the components.

6 Claims, 6 Drawing Sheets

AUTOMOTIVE LAMP HOUSING WITH BOND JOINT

TECHNICAL FIELD

The invention relates to lamp housings and particularly to automotive lamp housings. More particularly the invention is concerned with the structure of an automotive lamp housing assembly.

BACKGROUND OF THE INVENTION

Vehicle headlamps and other lamp housing assemblies include a light source, one or more lenses, a lamp housing or housing, and an applique. Appliques are decorative articles secured to a vehicle usually for aesthetic purposes. One common application of appliques is in the back-up and rear fog lamp assemblies. Such assemblies are generally mounted to the vehicle using screws, by welding or by snapping the various parts together in place. However, state and federal regulations for vehicle optical packages require that the lamp meet certain minimum lighting criteria, which indirectly requires a minimum reflector area. The reflector size can conflict with styling objectives and sheet metal manufacturing limitations. In addition, if located on a vehicle lift gate, there is minimal front to back space for the lamp housing, resulting in very tight space limitations. Providing a housing to lens coupling takes a first amount of space. Providing a lens to applique coupling takes a second amount of space. Hiding the seams internally for a cosmetic exterior surface takes a third amount of space. The cumulative competition for space in such tight quarters makes simple designs difficult.

The apparent alternative of more complex designs, leads to multiple components and a plurality of assemble steps. For example, parts may be screwed, or bolted to avoid multiple glue tracks. This leads in turn to increased component and assembly costs. Accordingly, minimization of the number of screws and nuts, or complete elimination of screws and nuts necessary in the construction of such optical packages, would be desirable, and so also would be the elimination of multiple glue tracks. It also would be desirable to design a housing assembly that requires less space, is less costly, and is easy to produce and install.

SUMMARY OF THE INVENTION

The problems of the prior art have been overcome by the present invention, which provides a vehicle lamp housing that uses a multiple-piece adhesive track to secure the components together. The assembly and seal can be formed in a single operation. The invention eliminates conventional fastening means such as welding, snaps, screws and nuts, as well as extra operations that would otherwise increase the cost of the finished product. In a preferred embodiment, the same adhesive that is used to seal the lens to the housing is also used for assembly of the components.

More specifically, the present invention uses a bonding agent to bond an applique, a lens, and a housing together. The applique and lens are designed such that when properly positioned with respect to each other, a groove is formed between them into which the housing is inserted. The bonding agent is applied to the groove to secure the pieces together. The system allows for a face down sequential construction from the backside without causing unsightly bonding agent to seep out the front face of the assembly. Only a single glue track is needed, and only a single gluing pass is necessary during construction.

DETAILED DESCRIPTION OF THE INVENTION

Figure 1:
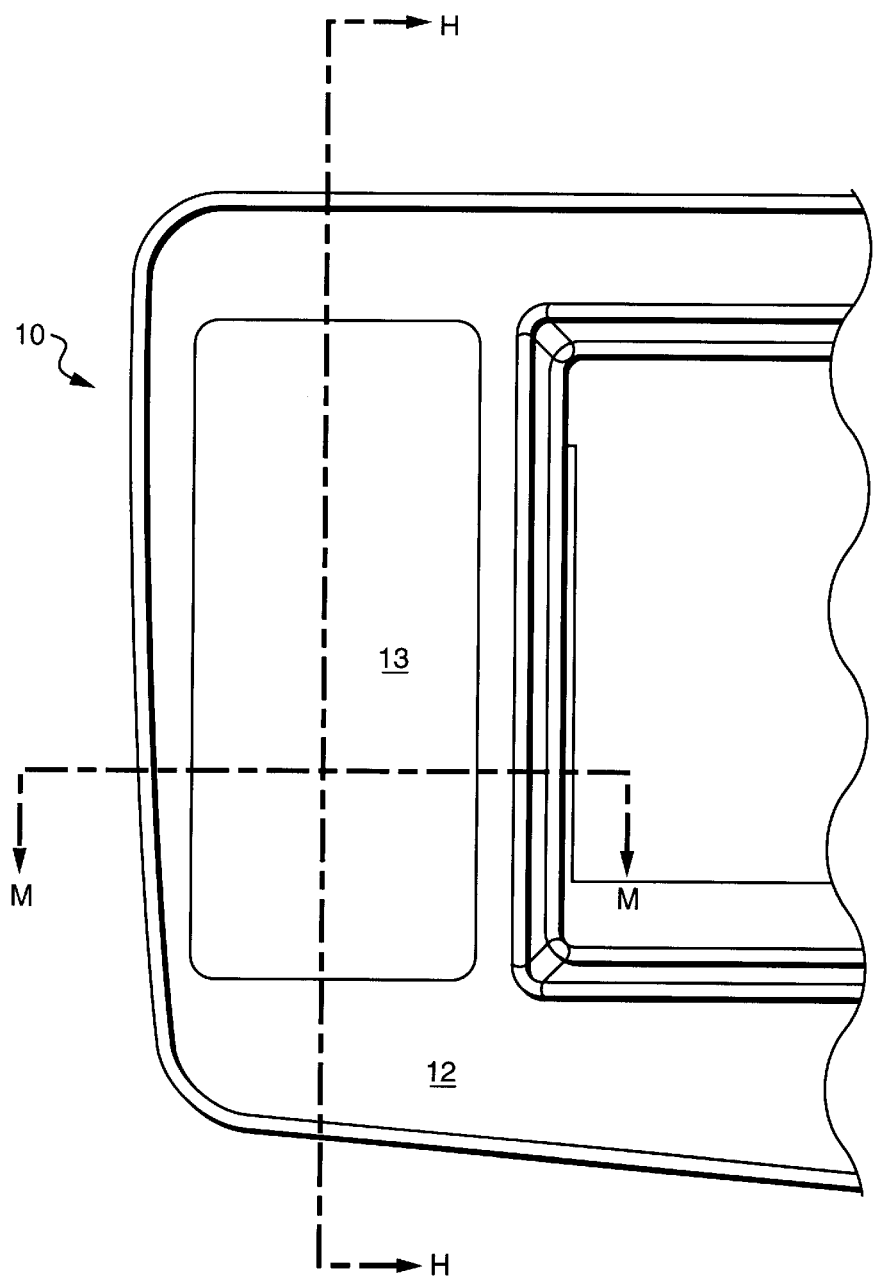
FIG. 1 is a rear view of the left side of an applique assembly supporting a preferred embodiment of a lamp housing assembly.
Figure 2:
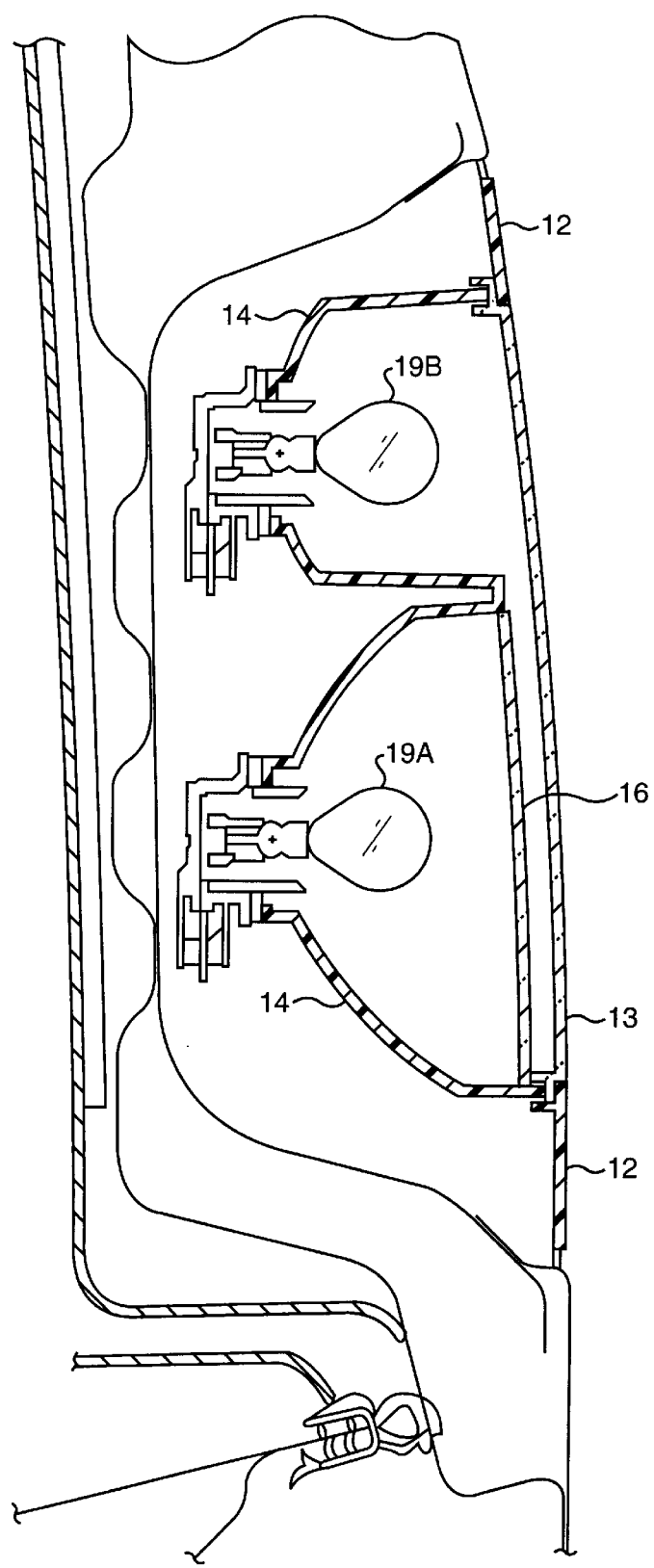
FIG. 2 is a sectional view, taken along line H—H of FIG. 1 including additional portions of the lift gate structure.
Figure 3:
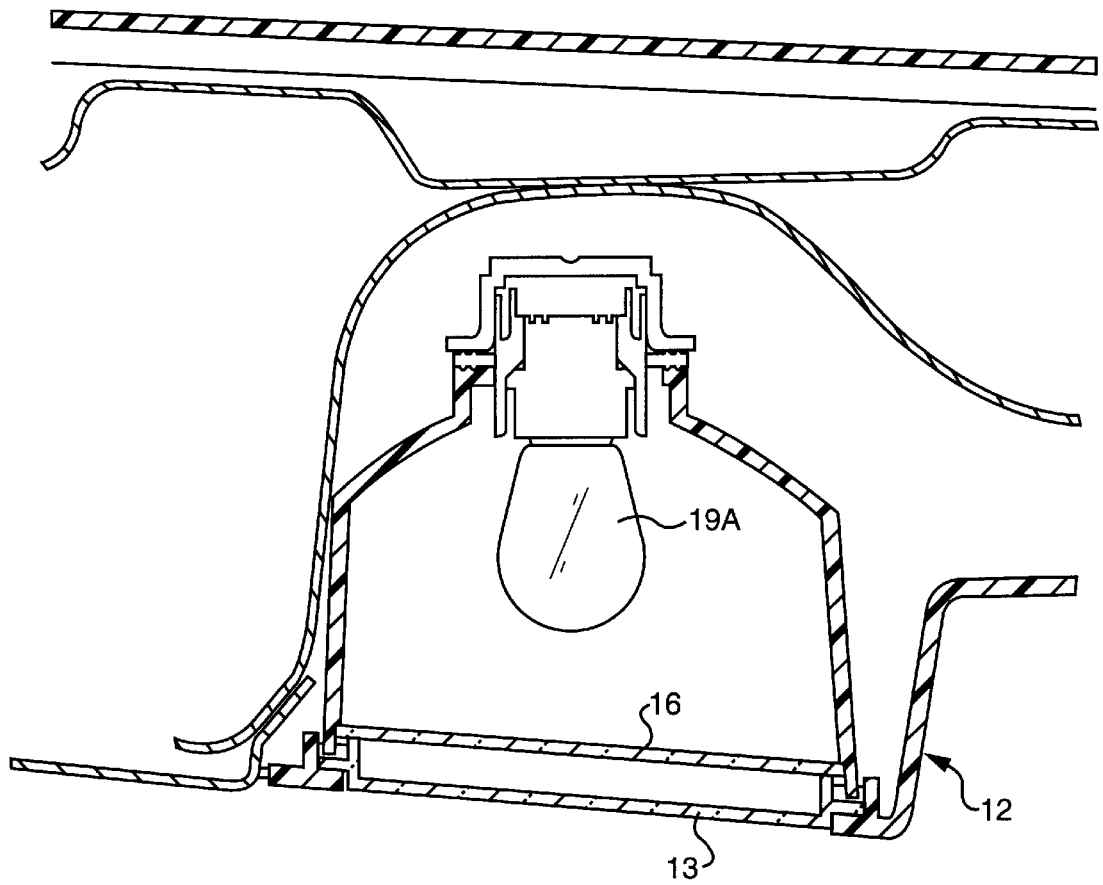
FIG. 3 is a sectional view, taken along line M—M of FIG. 1 including additional portions of the lift gate structure.

Turning now to FIGS. 1, 2 and 3, there is shown a left side of an applique assembly designed to be used as an insert in a rear lift gate of a vehicle. The appilque assembly supports a preferred embodiment of a lamp housing assembly generally at 10. The assembly includes portions of the applique 12 having an opening for an outer lens 13, preferably made of polycarbonate. The applique 12 is preferably made of polycarbonate if it is to be painted, or of acrylonitrile stryene for molded in color appliques. One or more lamp housings 14 (polycarbonate or Apec) are positioned behind the lens 13 as shown in FIGS. 2 and 3. In the embodiment depicted, the assembly houses two lamps, although those skilled in the art will appreciate that one lamp could be used or more than two lamps could be used depending upon the application. In one particular embodiment, lamp 19A is a rear fog lamp, and lamp 19B is a back-up lamp (FIG. 2). An inner red lens 16 (polycarbonate) is shown for the fog lamp 19A, positioned so as to define a gap between it and the outer lens 13. The outer lens 13 extends the entire opening in the applique 12, thereby providing a lens for both lamp 19A and 19B.

FIG. 3 shows a top cross-sectional view, where the lamp housing 14 encloses lamp 19A, which sits behind lens 13.

Figure 4:
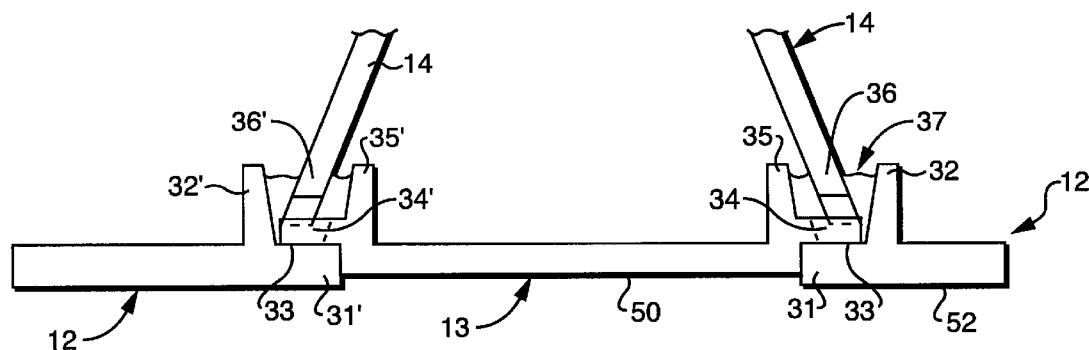
FIG. 4 is a schematic top view showing preferred embodiment of a glue track assembly.
Figure 5:
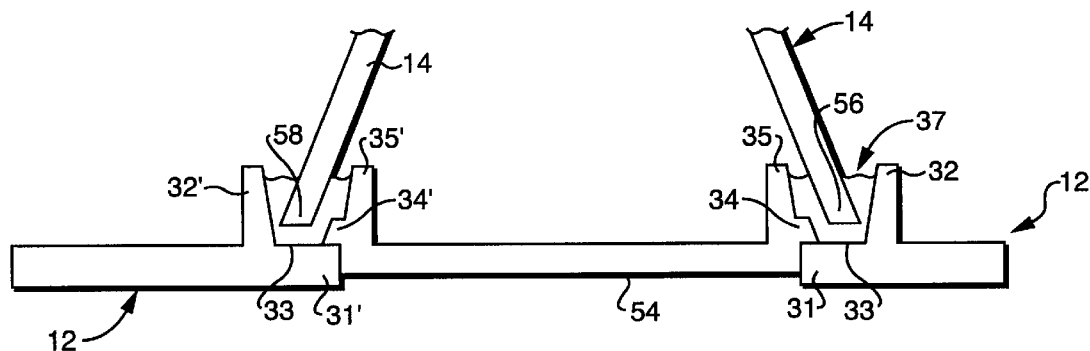
FIG. 5 is a schematic top view showing a first alternative embodiment of a glue track assembly.

FIGS. 4 and 5 show details of a glue track of the present invention. The preferred applique includes a defined opening, an interior surface of which is mated to an exterior surface of a lens. Applique 12 has a forward flange portion 31 and a vertically or upstanding depending wall 32. A similar flange portion 31' is spaced from section 31, the spacing accommodating outer lens 13. Spaced flange portion 31' also includes a vertically or upstanding depending wall 32'. The length of seat 33 of flange portion 31 is defined by the upstanding wall 32, and provides a base for the edge 34 of lens 13 to sit on. A similar arrangement is provided with flange portion 31'. Thus, the space between upstanding walls 32 and 32' defines the length of the outer lens 13 that seats between them.

Spaced inwardly from each edge 34, 34' of the lens 13 are respective upwardly depending walls 35, 35'. When the edges 34, 34' are seated on seats 33, 33', respectively, the upwardly depending wall 35 and upwardly depending wall 32 form between them a groove. Similarly, the upwardly depending wall 35' and upwardly depending wall 32' form between them a groove (which may be the same groove as between 32 and 35). The groove or grooves are dimensioned to accommodate the respective edges 36, 36' (which may be a single edge) of the lamp housing 14 as shown. Preferably the edges 36, 36' are straight walls, although the housing can be stepped into cutouts of the lens 13 to allow for improved retention to the applique 30.

A bonding material 37 placed in the groove contacts and secures the housing 14, the applique 12 and the lens 13 into a three-piece assembly. Suitable bonding materials include epoxies, preferably two-part epoxies such as two-part urethanes, and glues. After curing, the bond is strong enough that the assembly has to be destroyed to be taken apart. As a result, the lamp housing, lens and applique are secured without the use of screws, nuts or snaps, and with little lateral dimension devoted to the joint.

In a preferred embodiment, the edge 34, 34' is offset from (i.e., not linear with) the front face of the lens 13. This allows the lens front face 50 to be flush or substantially flush with the front face 52 of the applique.

It is not necessary that the defined groove extends all the way around the opening; separate segments could be used so long as there are a sufficient number of sections to provide the overall strength necessary to hold the pieces of the assembly together in use.

Unlike FIG. 4 wherein the edges 34, 34' of the lens 13 extend almost to the respective upstanding walls 32, 32' of the applique, and the housing 14 is bonded in the formed groove above the edges 34, 34', FIG. 5 illustrates an embodiment where the edges 34, 34' of the lens 54 are much shorter and thus do not extend to the upstanding walls 32, 32' of the applique 12. As a result, the edges 56, 58 (which may be the same edge) of the housing 14 extend further down into the groove toward the seat 33 of the flange portion 31 as shown.

Figure 6:
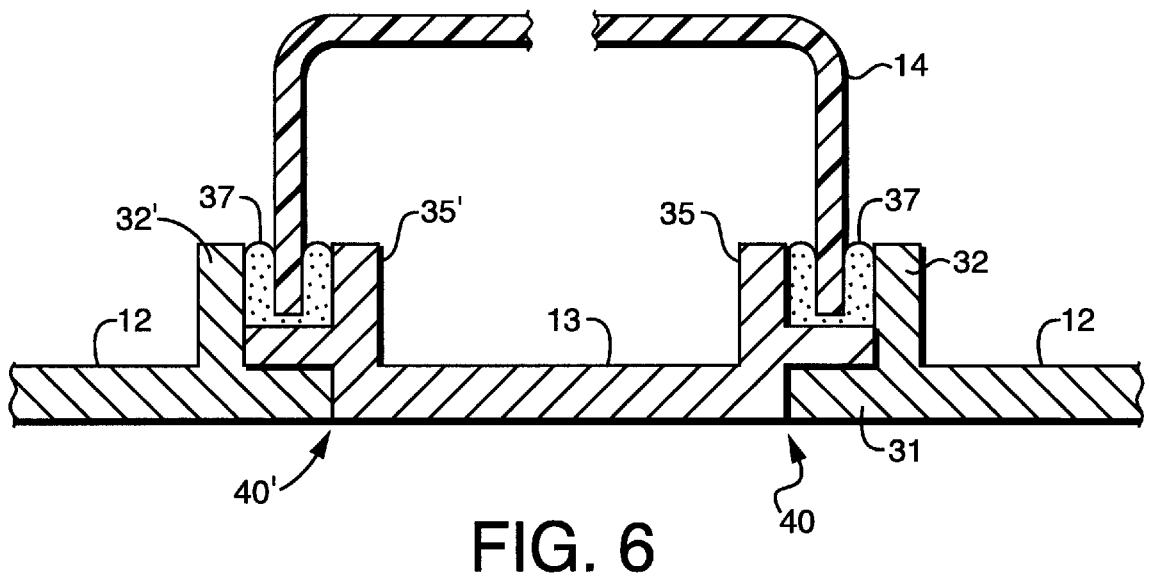
FIG. 6 is a schematic top view showing a second alternative embodiment of a glue track assembly.

FIG. 6 is another embodiment where the edges 34, 34' of the lens extend all the way to the respective upstanding walls 32, 32' to form sharp visual edges 40, 40'. Thus, the lens 13 and the applique 12 interlock in a stepped fashion to form the groove.

Figure 7:
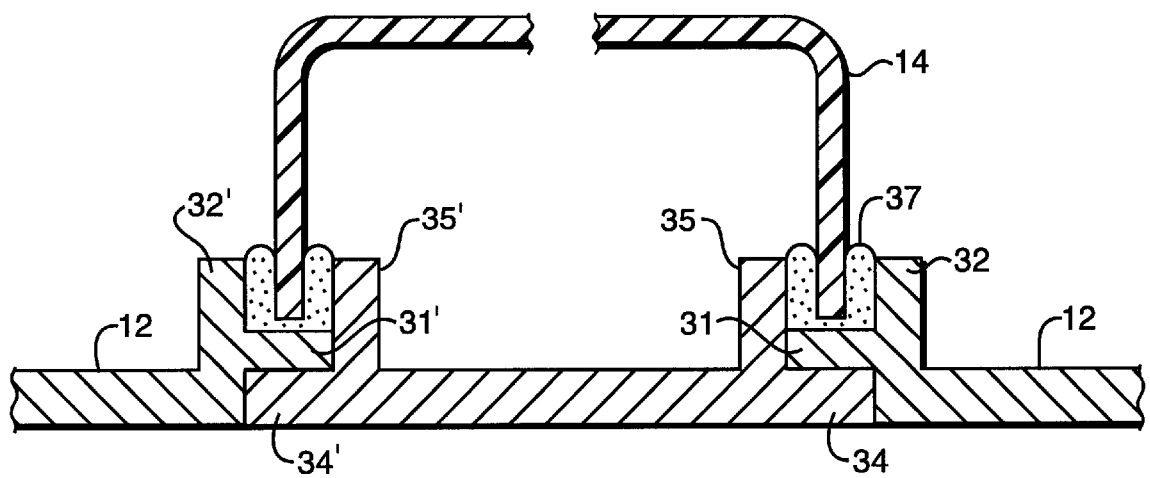
FIG. 7 is a schematic top view showing a third alternative embodiment of a glue track assembly.

FIG. 7 is similar to FIG. 6, except that the flange portions 31, 31' of the applique 12 rests on the respective edges 34, 34' of the lens rather than vice versa.

Figure 8:
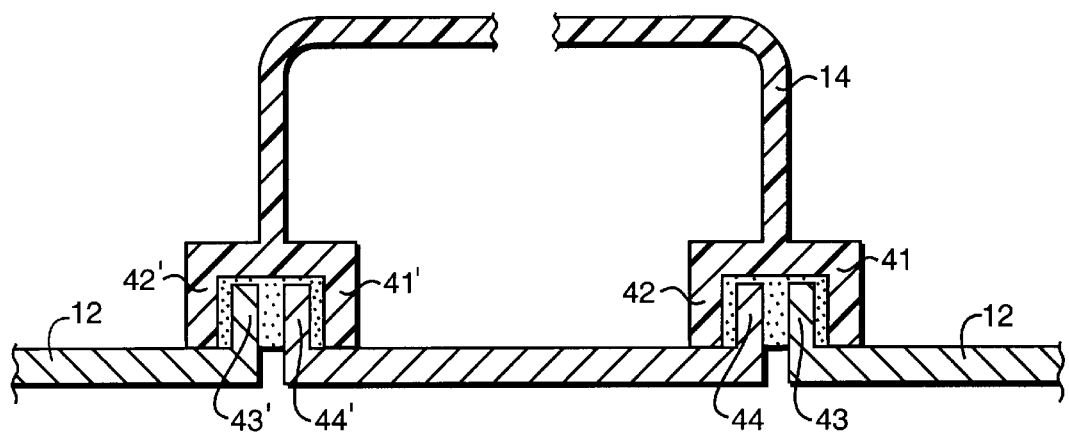
FIG. 8 is a schematic top view showing a fourth alternative embodiment of a glue track assembly.

FIG. 8 is a further embodiment, where the applique 12 and lens 13 do not interlock. Each groove is instead formed by two spaced downwardly depending walls 41, 42 of the housing 14. Upwardly extending walls 43, 43' of applique 12, and upwardly extending walls 44, 44' of lens 13, fit into each groove and are secured with bonding agent 37 as before.

Figure 9:
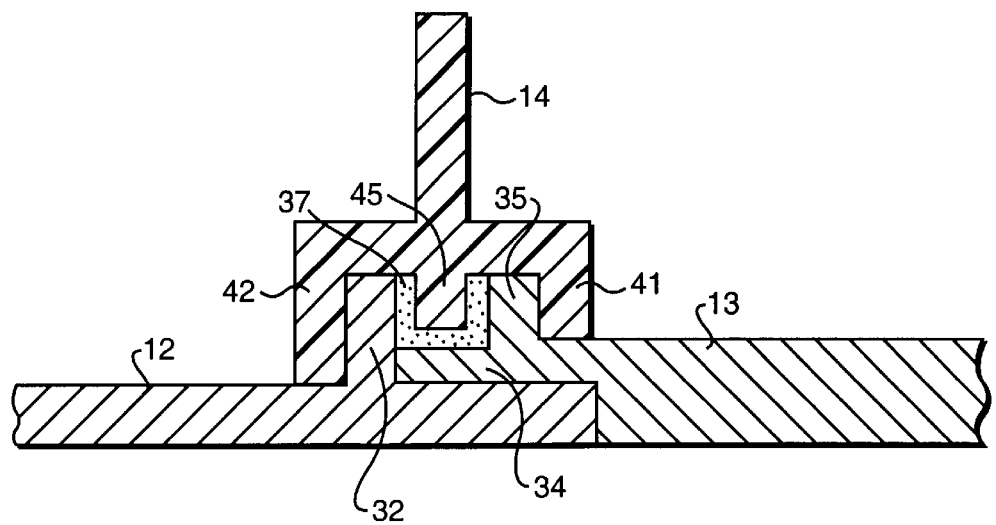
FIG. 9 is a schematic top view showing a fifth alternative embodiment of a glue track assembly.

FIG. 9 is an embodiment that combines various features from some of the previous embodiments. Downwardly depending walls 41 is slightly shorter than spaced downwardly depending wall 42 to accommodate the thickness of portion 34 of lens 13. As in the embodiment of FIG. 6, portion 34 of lens 13 interlocks against upstanding wall 32 of the applique 12 (intimate contact between the edge of portion 34 and the wall 32 is not necessary). The housing 14 can have a third downwardly depending wall 45, preferably centrally located with respect to walls 41 and 42, to help position the components in proper alignment.

Those skilled in the art will appreciate that the glue track of the present invention is not limited to application in the license pocket area of the vehicle. For example, the fascia of the vehicle could act as the portion of the glue track that performs the same as the license pocket in the above description, thereby allowing the conventional mounting to be eliminated or reduced to supporting the lamp in the fascia.

What is claimed is:

1. A lamp housing assembly comprising:

an applique comprising a first free edge adjacent an opening, said applique further comprising a first upstanding wall offset from said first free edge;

a lens having a face configured to be received in said opening, said lens having first lens edge extending from said face, a second upstanding wall offset from said first lens edge, a lamp housing having an edge;

said lens adapted to be disposed in said opening and in an abutting relation with said applique such that said first and second upstanding wall form between them a groove adapted to receive said edge of said lamp housing.

2. The lamp housing assembly of claim 1, further comprising a bonding material in said groove to secure said lens, applique and housing together.

3. The lamp housing assembly of claim 1, wherein said first lens edge sits on said first free edge and abuts said first upstanding wall.

4. The lamp housing assembly of claim 1, wherein said first free edge of said applique sits on said first lens edge and abuts said second upstanding wall of said lens.

5. The lamp housing assembly of claim 1, wherein said face of said lens is flush with said applique.

6. A vehicle lamp housing assembly comprising:

an applique with an interior edge defining an opening;

a lens with a circumferential edge, the lens located in the opening with a surface of the applique abutting a surface of the lens thereby defining a seam therebetween;

the applique having a wall portion adjacent the seam, the lens having a wall portion adjacent but offset from the applique wall portion thereby defining a groove intermediate the applique wall portion and the lens wall portion and extending adjacent the seam;

a housing having an edge positioned in the groove; and a bonding material positioned in the groove and bonding the applique, the lens and the housing as a unit.

\* \* \* \* \*